US012092279B2

(12) United States Patent
Hu et al.

(10) Patent No.: US 12,092,279 B2
(45) Date of Patent: Sep. 17, 2024

(54) LIGHT-EMITTING ASSEMBLY, VEHICLE LAMP AND VEHICLE

(71) Applicant: VALEO VISION, Bobigny (FR)

(72) Inventors: Qiang Hu, Wuhan (CN); Anna Gu, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/259,731

(22) PCT Filed: Jan. 5, 2022

(86) PCT No.: PCT/EP2022/050144

§ 371 (c)(1),
(2) Date: Jun. 28, 2023

(87) PCT Pub. No.: WO2022/148773

PCT Pub. Date: Jul. 14, 2022

(65) Prior Publication Data

US 2024/0068634 A1 Feb. 29, 2024

(30) Foreign Application Priority Data

Jan. 11, 2021 (CN) ......................... 202120060454.3

(51) Int. Cl.
*F21S 41/24* (2018.01)
*F21S 43/237* (2018.01)
(Continued)

(52) U.S. Cl.
CPC ............. *F21S 41/24* (2018.01); *F21S 43/237* (2018.01); *F21S 43/245* (2018.01); *F21S 43/27* (2018.01)

(58) Field of Classification Search
CPC ........ F21S 43/237; F21S 43/27; F21S 43/245; F21S 41/24
See application file for complete search history.

(56) References Cited

U.S. PATENT DOCUMENTS 8,488,937 B2 * 7/2013 Luca .................... G02B 6/0006 385/115
10,017,101 B2 * 7/2018 Herbin .................. F21S 43/245
(Continued)

FOREIGN PATENT DOCUMENTS

DE 10 2010 055 329 A1 6/2012
DE 10 2017 114 476 A1 1/2019
(Continued)

OTHER PUBLICATIONS

International Search Report mailed on Mar. 25, 2022 in PCT/EP2022/050144 filed on Jan. 5, 2022 (4 pages).

*Primary Examiner* — Matthew J. Peerce
(74) *Attorney, Agent, or Firm* — Oblon, McClelland, Maier & Neustadt, L.L.P.

(57) ABSTRACT

A light-emitting assembly includes a first light guide element and a second light guide element, which have end sections connected to each other, the end sections having a main light propagation direction. The first and second light guide elements further having light guide sections which spread out from the top of a connection region of the end sections. A middle element is located between the light guide sections of the light guide elements and spaced apart from the top, the middle element having a light entry face and a light exit face which is opposite the light entry face and configured to emit light between the spread-out light guide sections. At least one of the light entry face and the light exit face has a light-transmitting region with a predetermined shape, the light-transmitting region occupying a part of a corresponding face of the middle element.

19 Claims, 2 Drawing Sheets

(51) Int. Cl.

| | |
|---|---|
| ***F21S 43/245*** | (2018.01) |
| ***F21S 43/27*** | (2018.01) |

(56) References Cited

U.S. PATENT DOCUMENTS

| | | | | |
|---|---|---|---|---|
| 10,371,341 | B2 * | 8/2019 | Hanami ................ | F21S 43/241 |
| 2016/0347234 | A1 | 12/2016 | Herbin et al. | |
| 2020/0172001 | A1 | 6/2020 | Muegge | |
| 2021/0062993 | A1 | 3/2021 | Buisson et al. | |

FOREIGN PATENT DOCUMENTS

| | | | | |
|---|---|---|---|---|
| EP | 2 620 790 | A1 | 7/2013 | |
| EP | 3 098 500 | A1 | 11/2016 | |
| EP | 3205926 | A1 * | 8/2017 | ............... A22C 7/00 |
| EP | 3 252 368 | A1 | 12/2017 | |
| EP | 3 553 371 | A1 | 10/2019 | |
| WO | WO 2019/025393 | A1 | 2/2019 | |
| WO | WO 2019/158889 | A1 | 8/2019 | |
| WO | WO 2020/200216 | A1 | 10/2020 | |

* cited by examiner

LIGHT-EMITTING ASSEMBLY, VEHICLE LAMP AND VEHICLE

TECHNICAL FIELD

The present application relates to a light-emitting assembly, a vehicle lamp and a vehicle.

BACKGROUND ART

The use in vehicles of a light-emitting assembly comprising a light source in the form of a light-emitting diode and a light guide rod is known, wherein light emitted by the light source is coupled into the light guide rod and propagates in the light guide rod. The light that is coupled into the light guide rod is reflected by a light decoupling structure of the light guide rod, in order to destroy the conditions for total reflection of light in the light guide rod, so that the light can be emitted from the light guide rod. Such a light-emitting assembly may be used in a vehicle to perform a signalling and/or lighting function.

For example, a light-emitting assembly having two light guide rods is known; the two light guide rods are connected together at end regions allocated to light sources, and then spread apart to form light-emitting branches.

SUMMARY

The objective of the present application is to propose a light-emitting assembly which can be realized with a simple structure and can also display predetermined information.

A light-emitting assembly for a vehicle according to the present application, the light-emitting assembly comprising a first light guide element and a second light guide element, the first light guide element and second light guide element having end sections connected to each other, the end sections having a main light propagation direction, the first light guide element and second light guide element further having light guide sections which spread out from the top of a connection region of the end sections, and the light-emitting assembly further having a middle element which is located between the light guide sections of the first light guide element and second light guide element and spaced apart from the top, the middle element having a light entry face and a light exit face which is opposite the light entry face and configured to emit light between the spread-out light guide sections, wherein at least one of the light entry face and the light exit face has a light-transmitting region with a predetermined shape, the light-transmitting region occupying a part of a corresponding face of the middle element.

In the proposed light-emitting assembly, in addition to the light guide sections of the corresponding light guide elements being able to emit light, a predetermined light pattern can also be emitted through the light-transmitting region which occupies a part of a corresponding face of the middle element. The light-transmitting region may for example take the form of a numeral, pattern, letter or text, etc. or a combination thereof. For example, the light-transmitting region may be a logo or text of a vehicle brand. Thus, when a light source allocated to the light-emitting assembly is activated, light can pass through the light-transmitting region, whereas no light emerges from the middle element that is not occupied by the light-transmitting region; it is thus possible to distinguish more effectively information displayed through the light-transmitting region, and this enriches the display effect.

The expression "the top of the connection region of the end sections" can be understood as a region of the connection region of the end sections that is seen in the main light propagation direction.

According to an embodiment of the present application, the first light guide element and the second light guide element are columnar light guide rods. The light guide elements may have circular or elliptical cross sections, and can thus exhibit a linear display effect.

According to an embodiment of the present application, the end sections of the first light guide element and the second light guide element are connected together directly. In this case, light sources used for the light guide elements can be arranged very close to each other.

According to an embodiment of the present application, the end sections of the first light guide element and the second light guide element are connected together by means of a bridging section. Light entering the first light guide element and second light guide element can propagate into the bridging section. The two light guide elements can be spaced apart by means of the bridging section, and for this purpose, a face of the middle element that is used for arranging the light-transmitting region also has a greater length.

According to an embodiment of the present application, an optical face of the bridging section that faces toward the middle element has a wave-shaped cross section, to homogenize light exiting the bridging section. As an example, the wave-shaped cross section is triangular waves or arc-shaped waves.

According to an embodiment of the present application, the bridging section has a thickness of 3.5 mm-5 mm and a length of 3 mm-8 mm in directions transverse to the main light propagation direction. In addition, the bridging section and the middle element are spaced apart by a distance of 10 mm-30 mm. This ensures that the middle element is able to receive light over its entire extension. The distance by which the two parts are spaced apart is determined according to the diameter, thickness or radius of curvature of the light guide elements.

According to an embodiment of the present application, the light guide sections of the first light guide element and second light guide element have light decoupling structures, and starting ends of the light decoupling structures are located between the top of the connection region and the middle element. Thus, a portion of light exiting the light guide sections can reach the middle element, in order to adjust and in particular increase the intensity of light exiting through the light-transmitting region of the middle element.

According to an embodiment of the present application, protrusions are provided on side faces of the first light guide element and second light guide element which are located between the optical face and the light entry face. This is likewise beneficial for adjusting the uniformity of light exiting these side faces.

According to an embodiment of the present application, the middle element is removably fitted to the first light guide element and the second light guide element. Thus, the middle element can be made separately. This is beneficial for the processing of the light-transmitting region provided for the middle element.

According to an embodiment of the present application, the light-emitting assembly is a single-piece member. For this purpose, the light-emitting assembly may for example be injection-moulded.

According to an embodiment of the present application, when viewed in a direction against the main light propagation direction, the light-emitting assembly is linear.

According to another aspect of the present application, a vehicle lamp having the light-emitting assembly described above is proposed. The vehicle lamp may be a signal lamp, such as a front lamp or tail lamp, e.g. a brake lamp; and may also be an ornamental lamp, such as a grille lamp. Other vehicle lamps are of course also feasible.

According to another aspect of the present application, a vehicle having the light-emitting assembly or the vehicle lamp described above is proposed.

BRIEF DESCRIPTION OF THE DRAWINGS

The present application is further explained below with the aid of the drawings. In the drawings.

DETAILED DESCRIPTION OF EMBODIMENTS

Embodiments of the present application will be described demonstratively below. As those skilled in the art should realize, the embodiments explained may be amended in various ways without departing from the concept of the present invention. Thus, the accompanying drawings and the specification are in essence demonstrative and non-limiting. In the following text, identical drawing reference labels generally indicate functionally identical or similar elements.

Figure 1:
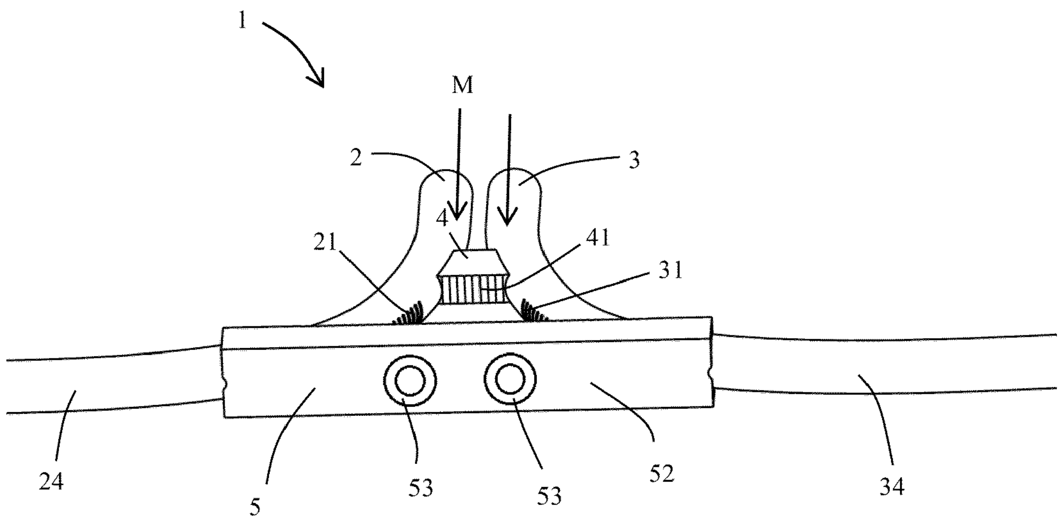
FIG. 1 shows schematically a partial three-dimensional drawing of the light-emitting assembly according to an embodiment of the present application.
Figure 2:
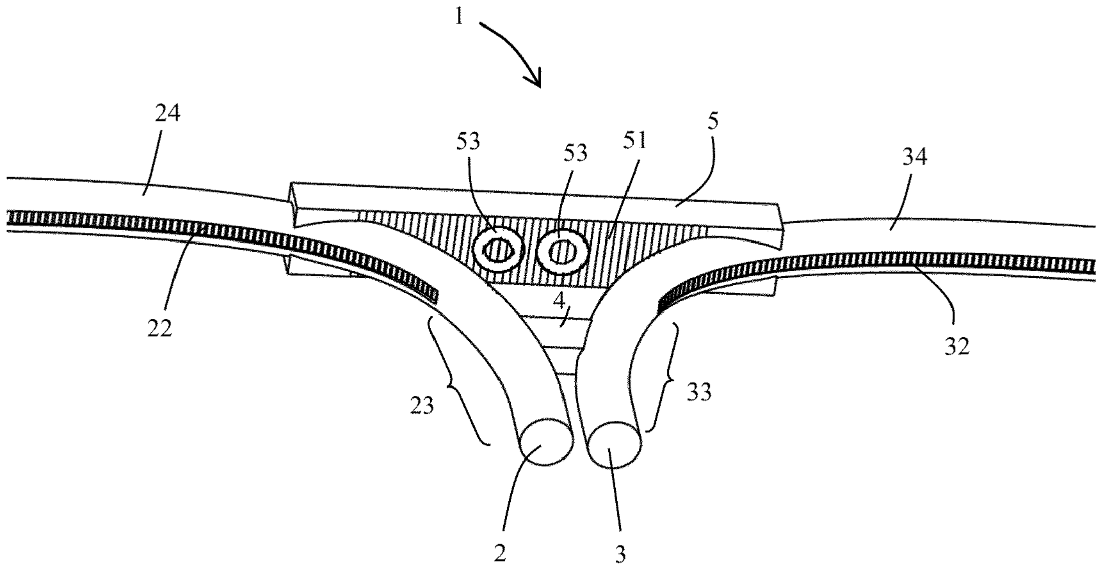
FIG. 2 shows another three-dimensional drawing of the light-emitting assembly in FIG. 1.

FIG. 1 shows schematically a partial three-dimensional view of a light-emitting assembly 1 for a vehicle according to the present application. In this embodiment, the light-emitting assembly 1 comprises a first light guide element 2 and a second light guide element 3 which are connected together and rod-like, for example columnar light guide rods; these can be provided with light sources L1, L2 respectively, preferably light-emitting diodes for example. In principle, any number of light guide elements may be selected. The two light guide elements spread out from a connection region; the example shown only shows a part of spread-out light guide sections 24, 34, which extend linearly. Specifically, end sections 23, 33 of the first light guide element 2 and second light guide element 3 are connected together, the end sections having a main light propagation direction M and spreading out from the top of a connection region of the end sections; the top is a region of the connection region that is located frontmost in the main light propagation direction M, and may be a line or a surface. In the case where the light-emitting assembly 1 is installed in a vehicle, the main light propagation direction M may correspond to a longitudinal direction of the vehicle, but may also have other suitable orientations. The spread-out light guide sections 24, 34 of the first light guide element 2 and second light guide element 3 of the light-emitting assembly 1 are further connected together by means of a middle element 5 extending therebetween, and light can exit through a part of a corresponding face of the middle element 5, i.e. a light-transmitting region 53. The middle element 5 has a light entry face 51, and a light exit face 52 which is opposite the light entry face 51 and configured to emit light between the spread-out light guide sections; the light-transmitting region 53 may be arranged at at least one of the light entry face 51 and the light exit face 52. For example, light-transmitting regions 53 arranged in the light exit face 52 are shown in FIG. 1, and light-transmitting regions 53 arranged in the light entry face 51 are shown in FIG. 2. In an example which is not shown, light-transmitting regions 53 may be arranged in the light entry face 51 and the light exit face 52, and for this purpose, the light-transmitting regions in the light entry face 51 and light exit face 52 overlap in the main light propagation direction M for example. The light-transmitting region 53 occupies a part of the total area of the relevant face mentioned above.

The middle element 5 is spaced apart from the top of the connection region. In the example shown, referring to FIGS. 1 and 2, the connection region is a bridging section 4 arranged between the light guide elements 2, 3, wherein a face of the bridging section 4 which faces toward the middle element 5 forms the top. Alternatively, in an example which is not shown, the end sections 23, 33 of the light guide elements 2, 3 may be connected together directly, in which case the top is in the form of a line.

The light entry face 51 of the middle element 5 may be oriented so as to be substantially perpendicular to the main light propagation direction M. The light entry face 51 and light exit face 52 are at least substantially parallel to each other.

In order to form the light-transmitting region 53 of the middle element 5, it is possible for example to apply a light-blocking layer to at least one of the light entry face 51 and light exit face 52 of the middle element 5, and leave a region for light to pass through in the light-blocking layer, so as to form the light-transmitting region 53. The light-blocking layer may for example be a coating, or a separate covering part attached to the middle element 5, with a light-transmitting area corresponding to the light-transmitting region.

As can be seen from the other three-dimensional drawing of the light-emitting assembly 1 in FIG. 2, the light guide sections 24, 34 have light decoupling structures 22, 32 respectively, which take the form of linear strips and are formed of consecutive optical teeth arranged side by side, in order to destroy the conditions for total reflection of light coupled into the light guide elements, so that light can emerge from the light guide sections 24, 34. The distance between the optical teeth is for example 1 mm-2 mm, e.g. about 1.5 mm. Starting sections of the light decoupling structures 22, 32 may be located between the top of the connection region and the middle element 5, such that light can be deflected from the light guide sections 24, 34 toward the middle element 5. Here, the light guide element may for example have a diameter of 6 mm-12 mm, and a minimum bending radius thereof in a longitudinal extension direction may be limited by this diameter, otherwise light leakage may occur in a bending region, resulting in reduced optical efficiency. Preferably, the bending radius of the light guide element should not be less than 7 times the diameter thereof.

As can be seen in FIGS. 1 and 2, the light-transmitting region 53 is annular. When the light source emits light, light reaching the middle element 5 can emerge from the light-transmitting region 53; the light-transmitting region 53 is lit up, while the remaining region of the middle element 5 is a dark region. The shape of the light-transmitting region 53 may be designed as required, including but not limited to taking the form of a numeral, pattern, letter or text, etc. or a combination thereof, thus making it possible to display predetermined information or a rich display effect.

In the case where the end sections 23, 33 of the light guide element are connected together by means of the bridging section 4, light can enter the bridging section 4 from the end sections 23, 33, and then be transmitted to the middle element 5 from the bridging section 4. As can be seen especially clearly from FIG. 4, an optical face 41 of the bridging section 4 that faces toward the middle element 5 has a cross section shaped like waves, for example triangular waves or arc-shaped waves. The bridging section 4 has a thickness of 3.5 mm-5 mm in a direction transverse to the main light propagation direction M, specifically in the direction perpendicular to the paper in FIG. 3, and has a length of 3 mm-8 mm in another direction transverse to the main light propagation direction M, specifically in the horizontal direction in FIG. 3. A wavelength of the smallest unit of the wave-shaped cross section may be 0.25 mm-1.5 mm, and is preferably 1 mm.

The bridging section 4 and the middle element 5 are spaced apart by a distance of 10 mm-30 mm, in order to ensure that light emitted from the light guide elements upstream of the middle element 5 in the main light propagation direction M can reach the middle element 5 in a broader fashion, i.e. in a diffused fashion. Thus, a uniform light output effect is achieved in the light-transmitting region 53 of the middle element 5.

The intensity of light reaching the middle element 5 may be adjusted by means of the bridging section 4 and/or the length of the light decoupling structures 22, 32 extending past the middle element 5 in a direction opposite to the main light propagation direction, so that the light of the middle element 5 and the illumination effect of the light guide sections 24, 34 of the light guide elements are uniform.

Figure 3:
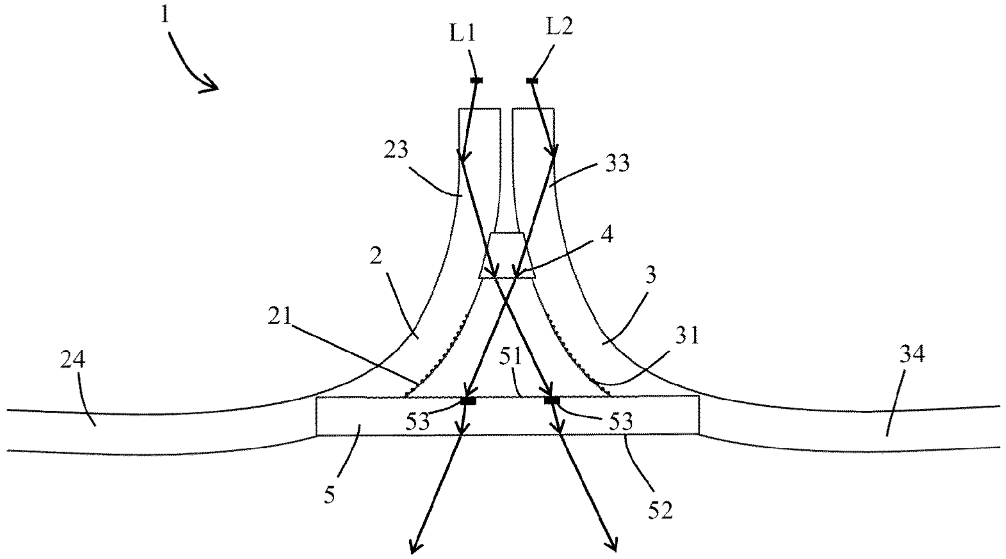
FIG. 3 shows a top view of the light-emitting assembly in FIG. 1, wherein some of the light paths of transmission in the light-emitting assembly are also schematically shown.
Figure 4:
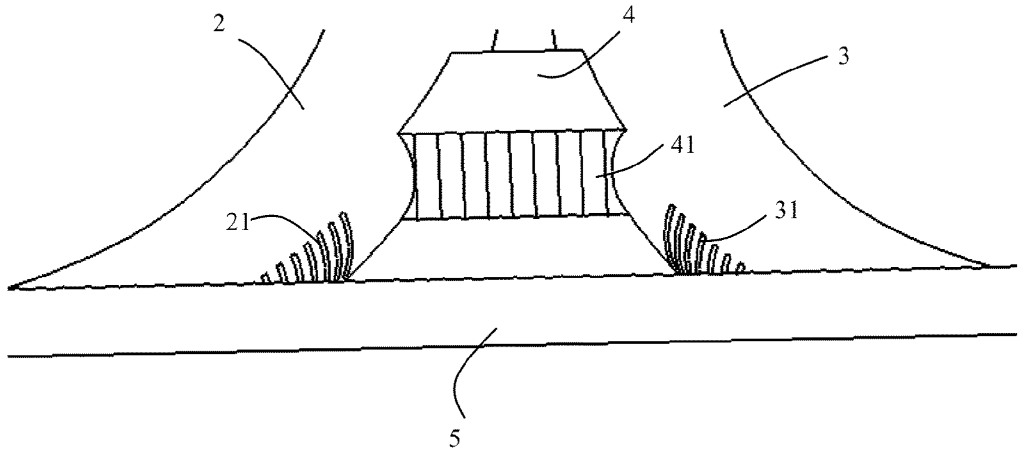
FIG. 4 shows a partial enlarged drawing of the light-emitting assembly in FIG. 1.

FIG. 3 shows a diagram of light paths through the light-emitting assembly 1; as can be seen, light emitted by the light sources L1, L2 arranged at ends of the light guide elements 2, 3 is coupled into the corresponding light guide elements respectively. For better clarity of illustration, only light that is transmitted through the bridging section 4 to the light-transmitting region 53 of the middle element 5 is shown here. Of course, light may emerge from the light guide sections 24, 34 and reach the middle element 5, and light may also be transmitted in the light guide sections 24, 34 in the directions of longitudinal extension thereof and emerge, but these light path diagrams are not shown in FIG. 3.

The light entry face 51 and light exit face 52 of the middle element 5 may be configured in a similar manner to the optical face 41 of the bridging section 4, i.e. have a cross section shaped like waves, for example triangular waves or arc-shaped waves. The middle element 5 and optical face 41 may also have other light homogenization structures.

Side faces of the first light guide element 2 and second light guide element 3 that are located between the optical face 41 and the light entry face 51, i.e. faces thereof which face toward the middle element 5, may be provided with protrusions 21, 31, in order to achieve uniformity of emergent light.

The middle element 5 is removably fitted to the first light guide element 2 and the second light guide element 3. For this purpose, two ends of the middle element 5 may for example be designed as snap-fit connectors, for engagement with the light guide elements.

The light-emitting assembly 1 may be a single-piece member, for example formed of a transparent material, in particular a colourless transparent material, such as polycarbonate (PC) or polymethyl methacrylate (PMMA).

When viewed in a direction opposite to the main light propagation direction M, the light-emitting assembly 1 is linear.

The present application, instead of being limited to the above-described structures, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A light-emitting assembly for a vehicle, the light-emitting assembly comprising:

a first light guide element;

a second light guide element, wherein the first light guide element and the second light guide element include end sections connected to each other, the end sections have a main light propagation direction, and the first light guide element and the second light guide element further include light guide sections that spread out from a top of a connection region of the end sections;

a middle element that is located between the light guide sections of the first light guide element and the second light guide element and spaced apart from the top, wherein the middle element includes a light entry face and a light exit face that is opposite to the light entry face and is configured to emit light between the spread-out light guide sections, wherein at least one of the light entry face and the light exit face includes a light-transmitting region with a predetermined shape, the light-transmitting region occupying a part of a corresponding face of the middle element, wherein the end sections of the first light guide element and the second light guide element are connected together and spaced apart from each other by a bridging section.

2. The light-emitting assembly as claimed in claim 1, wherein the first light guide element and the second light guide element are columnar light guide rods.

3. The light-emitting assembly as claimed in claim 2, wherein the end sections of the first light guide element and the second light guide element are connected together directly.

4. The light-emitting assembly as claimed in claim 2, wherein an optical face of the bridging section that faces toward the middle element has a wave-shaped cross section.

5. The light-emitting assembly as claimed in claim 4, wherein the wave-shaped cross section is triangular waves or arc-shaped waves.

6. The light-emitting assembly as claimed in claim 2, wherein the bridging section has a thickness of 3.5 mm-5 mm and a length of 3 mm-8 mm in directions transverse to the main light propagation direction.

7. The light-emitting assembly as claimed in claim 2, wherein the bridging section and the middle element are spaced apart by a distance of 10 mm-30 mm.

8. The light-emitting assembly as claimed in claim 1, wherein the light guide sections of the first light guide element and second light guide element have light decoupling structures, and starting ends of the light decoupling structures are located between the top of the connection region and the middle element.

9. The light-emitting assembly as claimed in claim 4, wherein protrusions are provided on side faces of the first light guide element and second light guide element which are located between the optical face and the light entry face.

10. The light-emitting assembly as claimed in claim 1, wherein the middle element is removably fitted to the first light guide element and the second light guide element.

11. The light-emitting assembly as claimed in claim 1, wherein the light-emitting assembly is a single-piece member.

12. The light-emitting assembly as claimed in claim 1, wherein when viewed in a direction against the main light propagation direction, the light-emitting assembly is linear.

13. A vehicle lamp, wherein the vehicle lamp has the light-emitting assembly as claimed in claim 1.

14. A vehicle, wherein the vehicle has the light-emitting assembly as claimed in claim 1.

15. The light-emitting assembly as claimed in claim 2, wherein the light guide sections of the first light guide element and second light guide element have light decoupling structures, and starting ends of the light decoupling structures are located between the top of the connection region and the middle element.

16. The light-emitting assembly as claimed in claim 5, wherein protrusions are provided on side faces of the first light guide element and second light guide element which are located between the optical face and the light entry face.

17. The light-emitting assembly as claimed in claim 2, wherein the middle element is removably fitted to the first light guide element and the second light guide element.

18. The light-emitting assembly as claimed in claim 2, wherein the light-emitting assembly is a single-piece member.

19. The light-emitting assembly as claimed in claim 2, wherein when viewed in a direction against the main light propagation direction, the light-emitting assembly is linear.

* * * * *